US012560238B2

(12) United States Patent
Zhao et al.

(10) Patent No.: US 12,560,238 B2
(45) Date of Patent: Feb. 24, 2026

(54) SPLIT OIL SEAL COMPOSED OF DOUBLE SPRINGS AND DOUBLE RINGS

(71) Applicant: AIGI Environmental Inc., Nanjing (CN)

(72) Inventors: Jingwei Zhao, Nanjing (CN); Jun Zhang, Nanjing (CN)

(73) Assignee: AIGI Environmental Inc., Nanjing (CN)

( * ) Notice: Subject to any disclaimer, the term of this patent is extended or adjusted under 35 U.S.C. 154(b) by 0 days.

(21) Appl. No.: 17/683,547

(22) Filed: Mar. 1, 2022

(65) Prior Publication Data

US 2022/0282792 A1     Sep. 8, 2022

(30) Foreign Application Priority Data

Mar. 3, 2021     (CN) .......................... 202110234917.8

(51) Int. Cl.
| *F16J 15/32* | (2016.01) |
| *F16J 15/3212* | (2016.01) |
| *F16J 15/3252* | (2016.01) |
| *F16J 15/3272* | (2016.01) |

(52) U.S. Cl.
CPC ....... *F16J 15/3272* (2013.01); *F16J 15/3212* (2013.01); *F16J 15/3252* (2013.01)

(58) Field of Classification Search
CPC ...... F16J 15/3248; F16J 15/3208; F16J 15/32; F16J 15/3284; F16J 15/3204; F16J 15/3252; F16J 15/3212; F16J 15/3272; F16C 33/72
See application file for complete search history.

(56) References Cited

U.S. PATENT DOCUMENTS

| | | | | |
|---|---|---|---|---|
| 1,407,714 A | * | 2/1922 | Whitcomb ................. | F16J 9/14 |
| | | | | 277/492 |
| 1,477,368 A | * | 12/1923 | Kottusch .................... | F16J 9/04 |
| | | | | 277/434 |
| 2,255,613 A | * | 9/1941 | Fisher, Jr. ............ | F16J 15/3212 |
| | | | | 277/577 |
| 2,273,962 A | * | 2/1942 | Hubbard .............. | F16J 15/3212 |
| | | | | 277/580 |
| 2,291,570 A | * | 7/1942 | Clark ................... | F16J 15/3212 |
| | | | | 277/577 |

(Continued)

*Primary Examiner* — Christine M Mills
*Assistant Examiner* — L. Susmitha Koneru
(74) *Attorney, Agent, or Firm* — Grogan, Tuccillo & Vanderleeden, LLP

(57) ABSTRACT

A split oil seal composed of double springs and double rings comprises an elastic outer ring intended to be statically mounted in a cavity outside a bearing box or gear box, and an elastic inner ring intended to be sleeved on a shaft of the device and held by the outer ring. The outer ring has an outer ring cut and the inner ring has an inner ring cut. The split oil seal further comprises a radial forcing element and a circumferential forcing element, wherein the radial forcing element exerts tension in both directions directed to outer circumferences and inner centers of both the outer ring and the inner ring in radial directions thereof, and the circumferential forcing element exerts a circumferential closing force to the inner ring. By using the split oil seal composed of double springs and double rings of the present invention, the advantages of convenient mounting and removal as well as strong anti-disengaging ability are achieved.

14 Claims, 5 Drawing Sheets

(56) References Cited

U.S. PATENT DOCUMENTS

| | | | | |
|---|---|---|---|---|
| 2,348,587 A * | 5/1944 | Antonelli | F16J 15/3272 | 277/575 |
| 2,434,484 A * | 1/1948 | Chambers, Jr. | F16J 15/3212 | 277/553 |
| 2,434,485 A * | 1/1948 | Chambers, Jr. | F16J 15/3212 | 277/572 |
| 2,675,258 A * | 4/1954 | Dutton-Forshaw | F16J 15/3212 | 267/155 |
| 3,127,185 A * | 3/1964 | Evans | F16J 15/3212 | 277/553 |
| 3,439,407 A * | 4/1969 | Haynie | F16J 15/3248 | 29/455.1 |
| 3,467,395 A * | 9/1969 | Kan | F16J 15/3268 | 277/925 |
| 3,489,420 A * | 1/1970 | Woodling | F16J 15/3284 | 277/944 |
| 3,612,547 A * | 10/1971 | Kan | F16J 15/3268 | 277/572 |
| 3,980,309 A * | 9/1976 | Dechavanne | F16J 15/3224 | 277/550 |
| 4,049,281 A * | 9/1977 | Bainard | F16J 15/3256 | 277/307 |
| 4,053,166 A * | 10/1977 | Domkowski | F16J 15/166 | 277/558 |
| 4,059,280 A * | 11/1977 | Eastwood | F16J 15/166 | 277/575 |
| 4,185,838 A * | 1/1980 | Danner | F16J 15/3264 | 277/412 |
| 4,194,748 A * | 3/1980 | Forch | F16J 15/3284 | 277/944 |
| 4,208,057 A * | 6/1980 | Messenger | F16J 15/3264 | 277/568 |
| 4,231,578 A * | 11/1980 | Traub | F16J 15/166 | 277/572 |
| 4,262,970 A * | 4/1981 | Haslett | F16J 15/3436 | 277/386 |
| 4,335,887 A * | 6/1982 | Benassi | F16J 15/3224 | 277/565 |
| 4,448,425 A * | 5/1984 | von Bergen | B63H 23/321 | 277/346 |
| 4,526,383 A * | 7/1985 | Fuchs | F16J 15/3284 | 277/575 |
| 4,541,640 A * | 9/1985 | Tregonning | F16J 15/3224 | 92/240 |
| 4,553,762 A * | 11/1985 | Hoelzer | F16J 15/3256 | 277/560 |
| 4,570,944 A * | 2/1986 | Traub | F16J 15/56 | 277/572 |
| 4,794,850 A * | 1/1989 | Nishii | B60T 13/563 | 277/577 |
| 4,844,485 A * | 7/1989 | Antonini | F16J 15/3284 | 277/553 |
| 4,869,514 A * | 9/1989 | Bogdanovic | F16J 15/3248 | 277/560 |
| 4,981,303 A * | 1/1991 | Matsushima | F16J 15/3264 | 277/351 |
| 5,018,749 A * | 5/1991 | Forch | F16J 15/3456 | 277/369 |
| 5,098,112 A * | 3/1992 | Petrak | F16J 15/3256 | 277/391 |
| 5,131,666 A * | 7/1992 | Hutchens | F16K 41/02 | 277/584 |
| 5,380,015 A * | 1/1995 | Laflin | F16J 15/3228 | 277/570 |
| 5,513,858 A * | 5/1996 | Deely | F16J 15/3272 | 277/572 |
| 5,607,168 A * | 3/1997 | Dahll | F16J 15/3232 | 277/575 |
| 5,695,201 A * | 12/1997 | Wheeler | F16J 15/3236 | 277/944 |
| 5,791,658 A * | 8/1998 | Johnston | F16J 15/3228 | 277/549 |
| 5,921,553 A * | 7/1999 | Klein | F16J 9/16 | 277/491 |
| 5,957,461 A * | 9/1999 | Ulrich | F16J 15/3224 | 384/138 |
| 6,045,135 A * | 4/2000 | Feistel | F16J 9/16 | 277/489 |
| 6,098,723 A * | 8/2000 | Yaniero | B25D 17/08 | 173/132 |
| 6,340,161 B1 * | 1/2002 | Zitting | F16J 9/16 | 277/497 |
| 6,428,014 B2 * | 8/2002 | Scarlett | F16J 9/16 | 277/435 |
| 6,623,011 B1 * | 9/2003 | Ueda | B23Q 11/0875 | 277/550 |
| 6,779,798 B1 * | 8/2004 | Fougerolle | F16J 15/3244 | 277/320 |
| 7,100,753 B1 * | 9/2006 | Stafford | F15B 13/0402 | 192/3.3 |
| 7,543,822 B2 * | 6/2009 | Grimanis | F16J 15/3272 | 277/580 |
| 7,815,193 B2 * | 10/2010 | Feistel | F04B 39/041 | 277/303 |
| 8,177,237 B2 * | 5/2012 | Lindner-Silwester | F16J 9/18 | 277/435 |
| 8,366,117 B2 * | 2/2013 | Miyake | F16J 15/3268 | 277/572 |
| 9,388,902 B2 * | 7/2016 | Sueyoshi | F16J 15/166 | |
| 9,816,566 B2 * | 11/2017 | Hess | F16C 21/005 | |
| 9,879,782 B2 * | 1/2018 | Bertini | F16J 15/3212 | |
| 10,337,617 B2 * | 7/2019 | Desjardins | F16J 15/3268 | |
| 10,443,727 B2 * | 10/2019 | Svrcek | F16F 9/368 | |
| 10,520,086 B2 * | 12/2019 | Scharrer | F16J 15/166 | |
| 11,131,386 B2 * | 9/2021 | Dahlhaus-Preussler | F16J 15/3232 | |
| 2003/0071422 A1 * | 4/2003 | Holder | F16J 15/442 | 277/348 |
| 2005/0067793 A1 * | 3/2005 | Klenk | F16J 15/3288 | 277/549 |
| 2007/0059954 A1 * | 3/2007 | Suggs, III | F16J 15/189 | 439/101 |
| 2012/0104701 A1 * | 5/2012 | Bertini | F16J 15/3212 | 277/573 |
| 2012/0169015 A1 * | 7/2012 | Oiyama | F16J 15/3268 | 277/562 |
| 2012/0292858 A1 * | 11/2012 | Jordan | F16J 15/3216 | 277/558 |
| 2014/0090554 A1 * | 4/2014 | Chalk | F16J 9/16 | 92/172 |
| 2015/0014945 A1 * | 1/2015 | Heise | F16J 15/125 | 277/637 |
| 2016/0010750 A1 * | 1/2016 | Colineau | F16J 15/3232 | 277/575 |
| 2016/0153563 A1 * | 6/2016 | Bissoon | F16J 15/3204 | 29/428 |
| 2018/0313449 A1 * | 11/2018 | Dahlhaus-Preussler | F16J 15/322 | |
| 2019/0063537 A1 * | 2/2019 | Dawson | B21F 35/00 | |
| 2019/0120385 A1 * | 4/2019 | von Engelbrechten | F16J 15/3284 | |
| 2020/0103028 A1 * | 4/2020 | Hintenlang | F16J 15/3228 | |
| 2020/0393045 A1 * | 12/2020 | Martin | F16J 15/3252 | |
| 2022/0282792 A1 * | 9/2022 | Zhao | F16J 15/3252 | |
| 2022/0381294 A1 * | 12/2022 | Cognolato | F16J 15/3236 | |

* cited by examiner

30

40

SPLIT OIL SEAL COMPOSED OF DOUBLE SPRINGS AND DOUBLE RINGS

CROSS-REFERENCE TO RELATED APPLICATION

This application claims priority to Chinese Application No. 202110234917.8 filed on Mar. 3, 2021, all of which is hereby incorporated by reference in its entirety

TECHNICAL FIELD

The present invention relates to a seal for the lubrication and protection of bearings and, in particular, to a split oil seal composed of double springs and double rings.

BACKGROUND

In various mechanical devices having a rotating configuration, bearings need to operate under lubrication conditions. In many cases, leakage of lubricant and entry of external contaminants can both cause damage to the bearings, and therefore, protection measures are required for the bearings. An oil seal is a barrier that acts as a bearing protector to protect the bearing and lubricant from external contamination or loss. Traditional skeleton oil seals mostly have an integrated structure and need to be mounted from one end of a shaft. This kind of oil seal has an advantage of good sealing performance, but there is a problem of inconvenient mounting and removal during the maintenance and use, etc. That is, in the case where other parts are arranged on the shaft, these parts may interfere with the mounting and removal of the bearing seal.

For this, a split bearing protector has been proposed, in which a ring structure of the bearing protector is broken at a certain point, i.e. there is a cut. Through the cut, the protector can be directly mounted on or removed from the shaft without interference of other parts. Chinese patent CN200620132712.X discloses a "double-ring split bearing protector", wherein a cut is provided at one point on a circular ring of the protector so the protector can be flexibly removed from a mounting shaft through the cut, and a straight cut is adopted at the cut of an inner ring and a leakage channel at the split portion of an inner ring sealing lip is linear. Under the condition that the shaft of the device moves violently, the split portion often has the possibility of dislocation and loosening, thus the sealing performance is impacted. Chinese patent CN203257896U discloses a "split oil seal with a staggered wedge-shaped interface form", which can lead an inner ring to be held tightly by an outer ring by changing the cut design at the split portion of the inner ring of the oil seal into a staggered wedge-shaped structure, thereby effectively avoiding the split portion of the inner ring sealing lip to be dislocated in the working process, but there is still a possibility that the split portion would be loosed. Due to the existence of the cut, under the condition that the shaft of the device vibrates and swings greatly, the situation that the cut of the sealing lip becomes loosed may still occur, resulting the sealing performance and the reliability of the protector may be reduced somewhat, and the requirements for safe production and environmental protection are affected.

Therefore, there is still a need for a split oil seal which is convenient to be mounted and removed and which has a strong anti-disengaging capability.

SUMMARY

The present invention aims to solve those problems in the prior art, that is, to provide a split oil seal which is convenient to be mounted and removed and which has a strong anti-disengaging capability.

To this end, the present invention provides a split oil seal composed of double springs and double rings, comprising an elastic outer ring and an elastic inner ring held by the outer ring, the outer ring having an outer ring cut and the inner ring having an inner ring cut, and further comprising a radial forcing element and a circumferential forcing element, wherein the radial forcing element exerts tension in both directions directed to outer circumferences and inner centers of both the outer ring and the inner ring in radial directions thereof, and the circumferential forcing element exerts a circumferential closing force to the inner ring.

Optionally, an embedded interference fit is formed between the outer ring and the inner ring.

Optionally, the radial forcing element is a finger spring.

Optionally, the outer ring has an outer peripheral portion located outermost in the radial direction and an extension portion extending radially inward from the outer peripheral portion, wherein an end of the extension portion is formed with a protruding portion extending axially and protruding from the extension portion in the radial direction, whereby an inner ring receiving groove is formed by the outer peripheral portion, the extension portion, and the protruding portion.

Optionally, the inner ring has an outer edge portion and a connecting portion which are received in the inner ring receiving groove, and a sealing lip extending from the connecting portion which is intended to abut tightly against the component to be sealed.

Optionally, the finger spring is clamped between the outer ring and the inner ring. Specifically, the finger spring has a first sheet that is clamped between the protruding portion of the outer ring and the outer edge portion of the inner ring, a second sheet that is fitted on the radially outward side of the seal lip of the inner ring, and a transition sheet that connects the two sheets and is disposed between the protruding portion of the outer ring and the connecting portion of the inner ring.

Optionally, an end of the second sheet of the finger spring is formed into a rolled hook construction in which the circumferential forcing element is partially received and held.

Optionally, the circumferential forcing element is a shaft type spring.

Optionally, the finger spring and the shaft type spring are each broken somewhere, and the two ends of the shaft type spring are connected by a hook-ring or matching helical interfaces.

Optionally, the split oil seal composed of double springs and double rings of the present invention further comprises a rigid support ring provided embedded between the outer ring and the inner ring.

Optionally, an insert-type joint is formed at the outer ring cut, the insert-type joint comprising an insertion portion formed by one end of the outer ring and an accommodating portion formed by the other end of the outer ring and matched with the insertion portion in shape.

Optionally, the insertion portion is formed in a trapezoidal shape, V-shape, toothed shape or hemispherical shape.

Optionally, the outer ring cut is offset from the inner ring cut by a distance of 10 degrees or more in a 360-degree circumference.

Optionally, the radial forcing element is a V-shaped spring, and the inner ring is formed with a first spring receiving groove for receiving and holding the V-shaped spring and a second spring receiving groove for receiving and holding the shaft type spring.

Optionally, the split oil seal composed of double springs and double rings of the present invention comprises two or more radial forcing elements and/or two or more circumferential forcing elements.

Optionally, the finger spring, the V-shaped spring, and the shaft type spring in use may be readily replaced to accommodate different radial and circumferential forcing requirements. For example, springs of different materials or dimensions (thickness, length, etc.) may be selected to meet the desired radial and circumferential forces.

By applying the split oil seal composed of double springs and double rings of the present invention, the radial forcing element and the circumferential forcing element are used in combination to realize the purposes of increasing the elastic force compensation range and, enhancing the closing forces to the inner ring cut and the outer ring cut, and effectively preventing the problem of the reduction of the sealing performance of the split oil seal caused by the loosening of the inner ring cut or the outer ring cut, so that the safety, reliability and durability of the sealing are greatly improved, thus achieving that the sealing of the inner ring cut and the outer ring cut would not be loosed and the sealing performance would be better under the conditions of large vibrations and swings of a device shaft to be sealed. Moreover, the split oil seal composed of double springs and double rings of the present invention also has the advantages of convenience in mounting and removal, reliability in operation and facilitation in wide application.

DETAILED DESCRIPTION

Preferred embodiments of a split oil seal composed of double springs and double rings of the present invention are described in detail with reference to the drawings in the following.

Figure 1:
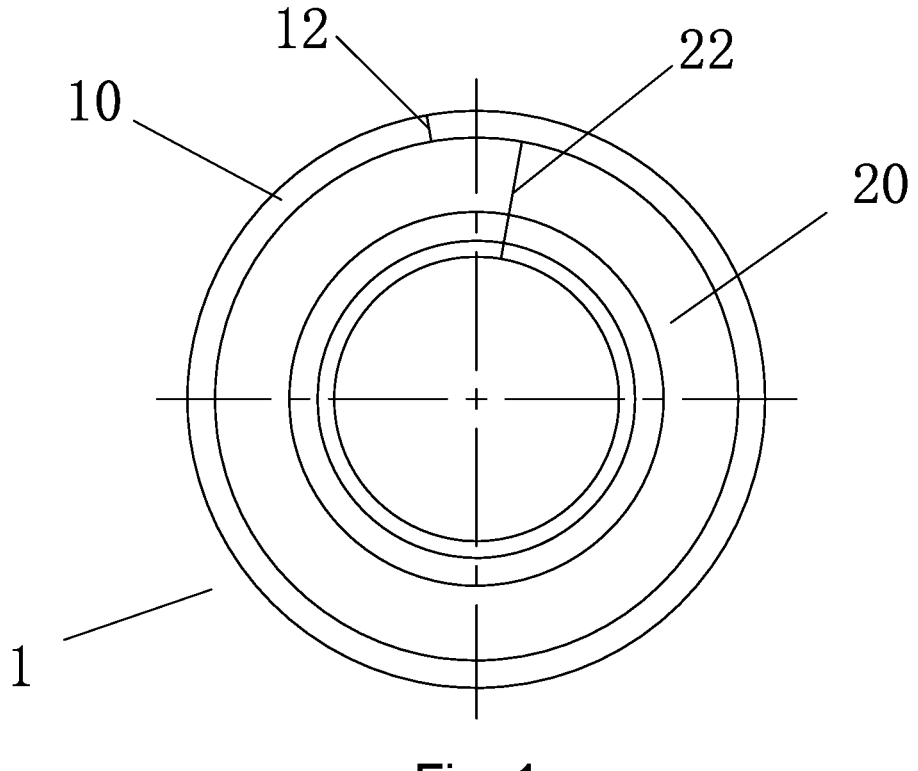
FIG. 1 is a right view of a split oil seal composed of double springs and double rings according to a first embodiment of the present invention.
Figure 2:
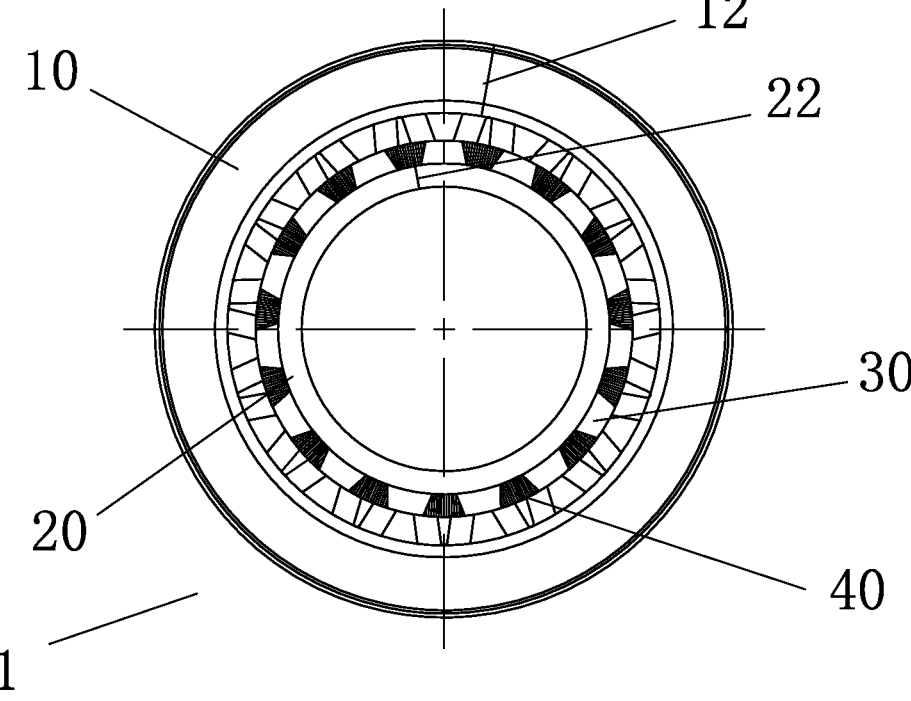
FIG. 2 is a left view of the split oil seal composed of double springs and double rings according to the first embodiment of the present invention.
Figure 3:
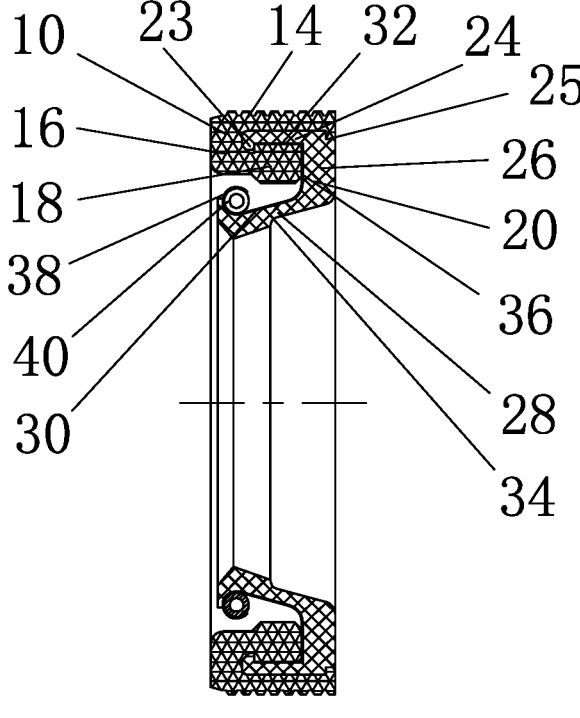
FIG. 3 is an axial sectional view of the split oil seal composed of double springs and double rings according to the first embodiment of the present invention.

FIGS. 1 to 3 show a first embodiment of the split oil seal composed of double springs and double rings according to the invention. The split oil seal 1 is intended to be placed in a cavity outside a bearing box or gearbox for sealing purposes. Referring firstly to FIG. 1 and FIG. 2, which show in right and left side views the split oil seal 1 composed of double springs and double rings of the first embodiment respectively, it can be seen that the split oil seal 1 comprises an elastic outer ring 10 and an elastic inner ring 20 held within the outer ring.

The outer ring 10 is made of an elastic material, such as a rubber-plastic material, and is mounted statically in a cavity (not shown) outside the bearing box or gearbox in use. The outer ring 10 can be mounted directly in the cavity or via an auxiliary element.

The outer side of the inner ring 20 is partially received in the inner side of the outer ring 10 such that the inner ring 20 is held by the outer ring 10. An embedded interference fit is employed between the outer ring 10 and the inner ring 20, thereby enhancing the holding effect of the outer ring 10 on the inner ring 20. For example, the outer ring 10 may have a slightly smaller circumference than the inner ring 20 at the interface of them, thereby allowing an interference fit between the outer ring 10 and the inner ring 20. Moreover, the inner side of the outer ring 10 may be provided with a shape suitable for holding the inner ring 20. For example, the inner side of the outer ring 10 is provided with an inner ring receiving groove matching the outer peripheral shape of the inner ring 20 to hold the inner ring 20 tightly in the inner ring receiving groove. The particular manner in which the outer ring 10 forms the inner ring receiving groove and forms the embedded interference fit with the inner ring 20 will be described in detail below with reference to FIG. 3.

The outer ring 10 is not a continuous ring but a split ring with an outer ring cut 12. That is, the outer ring 10 is broken at the outer ring cut 12. The outer ring cut 12 may be a straight cut. Alternatively, and more preferably, the outer ring cut 12 forms an insert-type joint 13, as described in detail below with reference to FIG. 5.

The inner ring 20, which in use is intended to be sleeved on a rotating shaft of a device, is also made of an elastic material, such as a rubber-plastic material. The materials used for the inner ring 20 and the outer ring 10 may be the same or different Like the outer ring 10, the inner ring 20 is also not a continuous ring, but a split ring with an inner ring cut 22. That is, the inner ring 20 is broken at the inner ring cut 22. The inner ring cut 22 may be a straight cut. Alternatively, an insert-type joint can also be formed like the outer ring cut 12.

It can also be seen from FIG. 1 that the outer ring cut 12 and the inner ring cut 22 are not arranged in alignment, but are offset by a distance of more than 10 degrees in a 360-degree circumference. The sealing ability of the split oil seal 1 can be improved by such offset arrangement of the cuts.

FIG. 2 shows that the split oil seal 1 composed of double springs and double rings of the first embodiment comprises, in addition to the outer ring 10 and the inner ring 20, a radial forcing element 30 and a circumferential forcing element 40. Both the radial forcing element and the circumferential forcing element are arranged between the outer ring 10 and the inner ring 20. The radial forcing element can exert tension in both directions directed to outer circumferences and inner centers of both the outer ring 10 and the inner ring 20 in radial directions thereof. The circumferential forcing element exerts a circumferential closing force to the inner ring 20. Due to the combined use of the radial forcing element and the circumferential forcing element, the elastic force compensation range is increased, the closing forces to the cuts of the inner ring 20 and the outer ring 10 are enhanced, and the problem that the sealing performance of the split oil seal 1 becomes reduced due to the fact that the cut of the inner ring 20 or of the outer ring 10 is loosed is effectively prevented.

FIG. 3 shows an axial sectional view of the split oil seal 1 composed of double springs and double rings of the first embodiment, which shows the embedded interference fit between the outer ring 10 and the inner ring 20. It can be seen that the outer ring 10 has an outer peripheral portion 14 located outermost in the radial direction and an extension portion 16 extending radially inward from the outer peripheral portion 14. An end of the extension portion 16 is formed with a protruding portion 18 extending axially and protruding in the radial direction from the extension portion 16, whereby an inner ring receiving groove is formed by the outer peripheral portion 14, the extension portion 16 and the protruding portion 18. The inner ring 20 has an outer edge portion 24 which is received in the inner ring receiving groove, a sealing lip 28 which is intended to abut tightly against the component to be sealed, and a connecting portion 26 which connects the outer edge portion 24 and the sealing lip 28. In order to enhance the holding of the inner ring 20 by the outer ring 10, the outer edge portion 24 of the inner ring 20 may be formed with a hook portion 23 and a recess 25 and the outer ring 10 may be formed with shapes complementary to the hook portion 23 and recess 25 respectively.

FIG. 3 further shows that the outer surface of the outer peripheral portion 14 of the outer ring 10 is provided with sealing lines of annularly arranged protrusions, thereby enhancing the sealing between the component in contact with the outer surface of the outer peripheral portion 14 of the outer ring 10 and the outer ring 10 when the outer ring 10 is mounted in the cavity outside the bearing box or gear box.

FIG. 3 further shows an axial cross-section of the radial forcing element and the circumferential forcing element according to the first embodiment. In this embodiment, the radial forcing element is a finger spring 30, and the finger spring 30 is clamped between the outer ring 10 and the inner ring 20. Specifically, the finger spring 30 has a first sheet 32 that is clamped between the protruding portion 18 of the outer ring 10 and the outer edge portion 24 of the inner ring 20, a second sheet 34 that is fitted on the radially outward side of the seal lip 28 of the inner ring 20, and a transition sheet 36 that connects the two sheets and is disposed between the protruding portion 18 of the outer ring 10 and the connecting portion 26 of the inner ring 20. By such arrangement between the finger spring 30 and the outer ring 10 and the inner ring 20, it is possible to exert tension in both directions directed to the outer circumferences and the inner centers of both the outer ring 10 and the inner ring 20 in radial directions thereof.

Although not shown in FIG. 3, the finger spring 30 is not a continuous finger spring along the entire circumference of the inner ring 20, but is broken at some point to facilitate removal of the assembled split oil seal without interference from other parts on the shaft. As can also be seen from FIG. 3, an end of the second sheet 34 of finger spring 30 is formed into a rolled hook construction 38 in which the circumferential forcing element is partially received and held.

In this embodiment, the circumferential forcing element is a shaft type spring 40. In the assembled split oil seal, the shaft type spring 40 exerts a circumferential closing force to the cut 22 of the inner ring 20.

The shaft type spring 40 is also not a continuous shaft type spring along the entire circumference of the inner ring 20, but is at least broken at somewhere. Since the shaft type spring 40 has a relatively larger elasticity than the finger spring 30, in order to keep the shaft type spring 40 exerting a more stable circumferential closing force to the cut 22 of the inner ring 20, it is preferable that the two ends of the broken shaft type spring 40 are connected by a hook-ring or matching helical interfaces. With the shaft type spring 40 having such a configuration, the mounting and removal of the split oil seal can be facilitated while maintaining a stable circumferential closing force.

Figure 4:
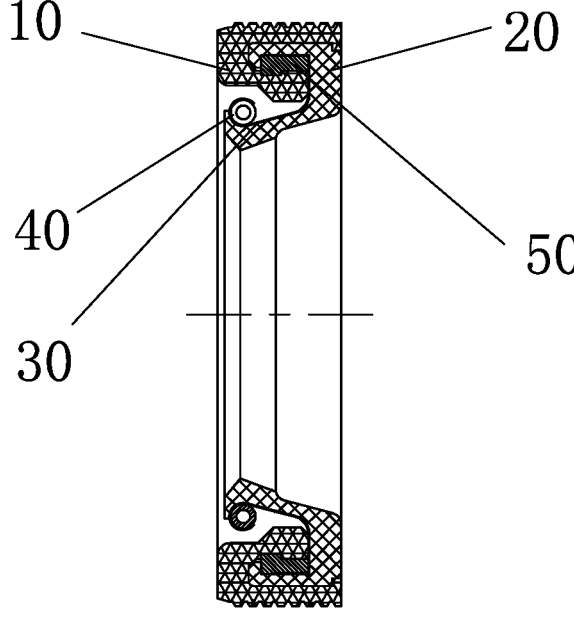
FIG. 4 is an axial sectional view of a split oil seal composed of double springs and double rings according to a second embodiment of the present invention.

FIG. 4 shows an axial sectional view of a split oil seal composed of double springs and double rings of a second embodiment, which is different from the embodiment shown in FIG. 3 in that a rigid support ring 50 is provided embedded between the outer ring 10 and the inner ring 20, in particular, provided embedded in the space enclosed by the protruding portion 18 of the outer ring 10, the outer edge portion 24 of the inner ring 20 and the finger spring 30. The rigid support ring 50 is an optional component in the split oil seal composed of double springs and double rings. Depending on the practical application scenario, for example, when there is a slight pressure inside the split oil seal or there is no rigid support member such as a pressure plate outside the split oil seal, the embedded rigid support ring 50 can provide the required rigid support effect for the split oil seal.

Figure 5:
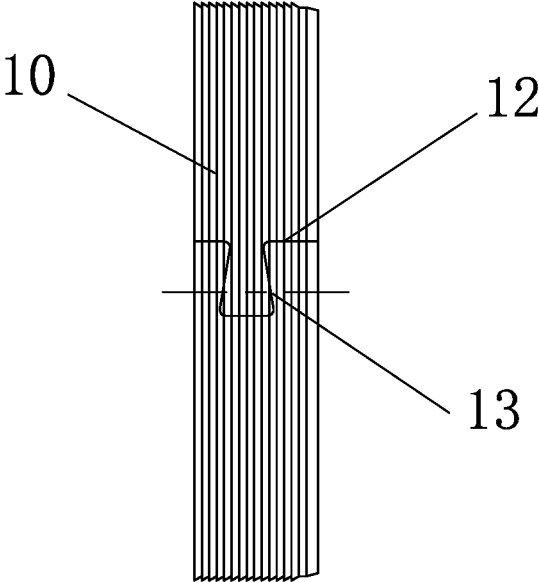
FIG. 5 is a view of the insert-type joint formed by the outer ring cut according to the present invention when viewed from the outside of the oil seal.

FIG. 5 shows that an insert-type joint 13 is formed at the outer ring cut 12. That is, at the outer ring cut 12, one end of the outer ring 10 has an insertion portion that protrudes in the circumferential direction, and the other end of the outer ring 10 has an accommodating portion that matches the shape of the insertion portion. When the insertion portion is inserted into the accommodating portion, the insertion portion and the accommodating portion form a tightly fitting insert-type joint 13, so that the outer ring 10 forms an integral circular ring.

FIG. 5 shows that the insertion portion is trapezoidal, but it may also be formed in a V-shape, a toothed shape, a hemispherical shape and so on, or a combination of different shapes, or the like, and the shape of the accommodating portion may be adaptively changed according to the shape of the insertion portion. The use of the insert-type joint 13 instead of a straight cut improves the integrity of the outer ring and thus the entire split oil seal, thereby ensuring a more reliable operation of the split oil seal.

Figure 6:
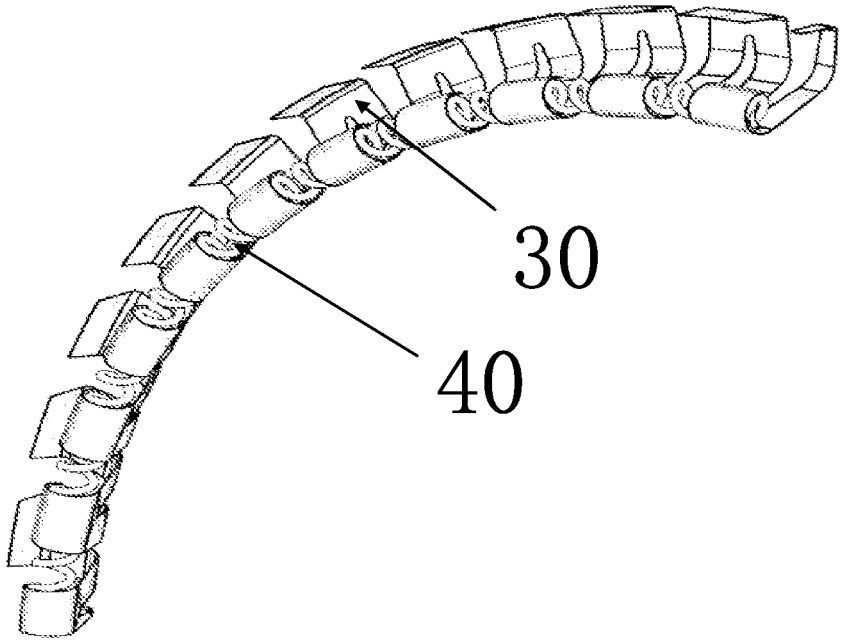
FIG. 6 is a partially enlarged view of the combination of the double springs according to the present invention.

FIG. 6 shows a partially enlarged view of the combination of the double springs used in the first and second embodiments, showing the structural details of the double springs, i.e., the finger spring 30 and the shaft type spring 40 as previously described. The shaft type spring 40 is received and held in the hook construction 38 of the finger spring 30, and when the finger spring 30 is further clamped between the outer ring 10 and the inner ring 20 as shown in FIGS. 3 and 4, the finger spring 30 can exert tension in both directions directed to the outer circumferences and the inner centers of both the outer ring 10 and the inner ring 20 in radial directions thereof, and the shaft type spring 40 further exerts a circumferential closing force to the inner ring 20.

Figure 7:
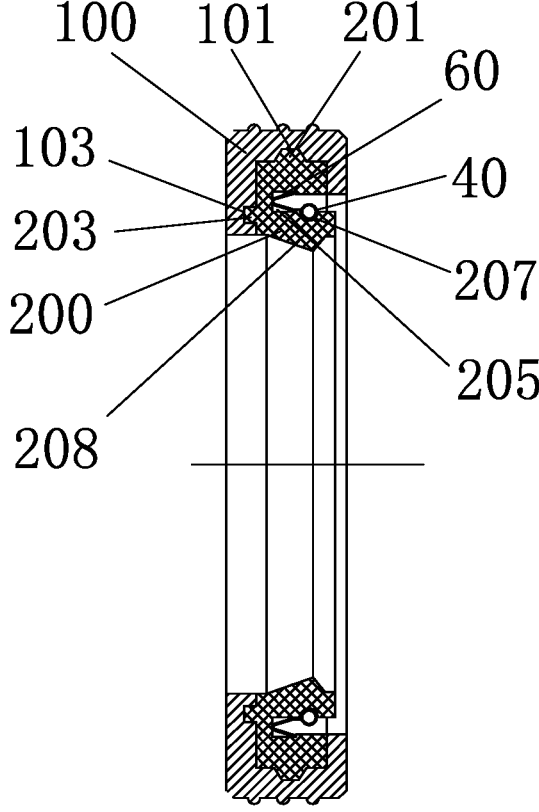
FIG. 7 is an axial sectional view of a split oil seal composed of double springs and double rings according to a third embodiment of the present invention.

FIG. 7 shows an axial sectional view of a split oil seal composed of double springs and double rings of a third embodiment, wherein instead of the finger spring, a V-shaped spring 60 is used as the radial forcing element, and a shaft type spring 40 is still used as the circumferential forcing element.

In order to securely hold the V-shaped spring 60 and the shaft type spring 40, the configurations of the outer ring 100 and the inner ring 200 are adjusted accordingly based on the first embodiment. Specifically, the outer ring 100 is formed to have a generally U-shaped axial cross-section to receive the inner ring 200. The inner ring 200 is also formed to have a substantially U-shaped axial cross-section, and the portions of the inner ring 200 other than the seal lip 208 are arranged in conformity with the inner surface of the outer ring 100 and held by the outer ring 100. To enhance the holding of the inner ring 200 by the outer ring 100, the inner ring 200 can be formed with a radial protrusion 201 and an axial protrusion 203 as shown in FIG. 7, and the outer ring 100 is formed with a radial recess 101 and an axial recess 103 for receiving the radial protrusion 201 and the axial protrusion 203, respectively.

As can also be seen in FIG. 7, the inner ring 200 is further formed with a first spring receiving groove 205 for receiving and holding the V-shaped spring 60 and a second spring receiving groove 207 for receiving and holding the shaft type spring 40. The first spring receiving groove 205 has, for example, a square axial cross-section to clamp the V-shaped spring 60 therein, so that the V-shaped spring 60 exerts tension in both directions directed to the outer circumferences and the inner centers of both the outer ring 10 and the inner ring 20 in radial directions thereof, and prevents the V-shaped spring 60 from being undesirably displaced relative to the inner ring 200. The second spring receiving groove 207, for example, has a hemispherical axial cross-section to receive and hold the shaft type spring 40 therein such that the shaft type spring 40 further exerts a circumferential closing force to the inner ring 200 while preventing undesired displacement of the shaft type spring 40 relative to the inner ring 200.

The outer ring 100 and the inner ring 200 according to the third embodiment have the same cuts as the outer ring and the inner ring described in the first embodiment respectively. The V-shaped spring 60 according to the third embodiment has the same broken configuration as the finger spring 30 described in the first embodiment, and the shaft type spring 40 according to the third embodiment has the same broken configuration as the shaft type spring 40 described in the first embodiment and preferably also has two end connected by a hook-ring or matching helical interfaces. In addition, the split oil seal composed of double springs and double rings according to the third embodiment may also have the rigid support ring provided embedded between the outer ring and the inner ring described in the first embodiment to provide rigid support for the split oil seal. These configurations, which are the same as those of the first embodiment, are not described in detail herein.

According to the practical application scenario of the split oil seal composed of double springs and double rings of the present application, a finger spring or a V-shaped spring may be chosen to be used as the radial forcing element. It can be seen from FIG. 3 that the first sheet 32 of the finger spring 30 is tightly clamped between the protruding portion 18 of the outer ring 10 and the outer edge portion 24 of the inner ring 20, and the shaft type spring 40 is held in the hook construction 38 of the finger spring 30, such an arrangement results that the assembled split oil seal is adaptable to the situations where the shaft to be sealed has a large run-out or the shaft to be sealed has a large shaft diameter, such that the inner ring cut and the outer ring cut of the split oil seal are not easily loosed and the finger spring and the shaft type spring are not easily displaced. It can be seen from FIG. 7 that the V-shaped spring 60 and the shaft type spring 40 are held in the first spring receiving groove 205 and the second spring receiving groove 207 of the inner ring 200, respectively, in such a manner the assembly of the device is very easy, but this manner is more suitable for the situations where the shaft to be sealed has less run-out or the shaft to be sealed has a smaller shaft diameter.

Only the situations where the radial forcing element is one finger spring or V-shaped spring and the circumferential forcing element is one shaft type spring have been described above. However, different variations are possible according to the actual application requirements. For example, two or more radial forcing elements and/or two or more circumferential forcing elements may be employed in order to exert the desired radial or circumferential force. For example, one or more finger springs and one or more shaft type springs, or one or more V-shaped springs and one or more shaft type springs, or even a combination of the finger springs, the V-shaped springs, and the shaft type springs may be employed as long as it is sufficient to exert both the tension in both directions directed to the outer circumferences and the inner centers of both the outer ring and the inner ring in radial directions thereof as well as exert a circumferential closing force to the inner ring.

In order to adapt to different requirements for the radial and circumferential forces, the finger spring, V-shaped spring and shaft type spring in use can be conveniently replaced. For example, springs of different materials or dimensions (thickness, length, etc.) may be selected to meet the desired radial and circumferential forces.

With the split oil seal composed of double springs and double rings of the present invention, the radial forcing element and the circumferential forcing element are used in combination to realize the purposes of increasing the elastic force compensation range and, enhancing the closing forces to the inner ring cut and the outer ring cut, and effectively preventing the problem of the reduction of the sealing performance of the split oil seal caused by the loosening of the inner ring cut or the outer ring cut, so that the safety, reliability and durability of the sealing are greatly improved, thus achieving that the sealing of the inner ring cut and the outer ring cut would not be loosed and the sealing performance would be better under the conditions of large vibrations and swings of a device shaft to be sealed. Moreover, the split oil seal composed of double springs and double rings of the present invention also has the advantages of convenience in mounting and removal, reliability in operation and facilitation in wide application.

The feasible but non-limiting embodiments of the split oil seal composed of double springs and double rings according to the present invention are described in detail above with reference to the drawings. For the person skilled in the art, without departing from the scope and essence of the present invention as set forth in the claims below, modifications and additions to the technology and structure, as well as the recombination of the features in each embodiment, are obvious should be considered to be included in the scope of the present invention. Therefore, all the modifications and additions that can be conceived under the teaching of the present invention should be regarded as a part of the present invention. The scope of the present invention is defined by the appended claims below, and includes equivalent technologies known at the filing date of the present invention and equivalent technologies that have not been foreseen.

What is claimed is:

1. A split oil seal composed of double springs and double rings, comprising an elastic outer ring (10, 100) and an elastic inner ring (20, 200) held by the outer ring (10, 100), the outer ring (10, 100) having an outer ring cut (12) and the inner ring having an inner ring cut (22), said inner and outer ring cuts defining a structural break extending completely through the body of each of said inner ring and said outer ring, characterized in that said split oil seal further comprises a radial forcing element and a circumferential forcing element, the radial forcing element exerting tension in both directions and thus directed to outer circumferences and inner centers of both the outer ring (10, 100) and the inner ring (20, 200) in radial directions thereof, and the circumferential forcing element exerts a circumferential closing force to the inner ring (20, 200);

wherein the outer ring (10, 100) includes an outer peripheral portion (14) located outermost in a radial direction, an extension portion (16) extending radially inward from the outer peripheral portion (14), and a protruding portion (18) extending axially and protruding in the radial direction from the extension portion (16) to form an inner ring receiving groove, wherein the inner ring is captured between opposing axially extending faces of the protruding portion (18); and wherein the radial forcing element and the circumferential forcing element are disposed between the inner ring (20, 200) and the outer ring (10, 100).

2. The split oil seal according to claim 1, characterized in that an embedded interference fit is formed between the outer ring (10, 100) and the inner ring (20, 200).

3. The split oil seal according to claim 1, characterized in that the radial forcing element is a finger spring (30).

4. The split oil seal according to claim 3, characterized in that the circumferential forcing element is a shaft type spring (40).

5. The split oil seal according to claim 4, characterized in that the finger spring (30) is formed with a rolled hook construction (38) and the shaft type spring (40) is held in the hook construction (38).

6. The split oil seal according to claim 4, characterized in that the shaft type spring (40) is broken at somewhere and two ends of the shaft type spring (40) are connected by a hook-ring or matching helical interfaces.

7. The split oil seal according to claim 3, characterized in that the finger spring (30) is clamped between the outer ring (10, 100) and the inner ring (20, 200).

8. The split oil seal according to claim 1, characterized in that the radial forcing element is a V-shaped spring (60) and the circumferential forcing element is a shaft type spring (40).

9. The split oil seal according to claim 8, characterized in that the inner ring (20, 200) is formed with a first spring receiving groove (205) for receiving and holding the V-shaped spring (60) and a second spring receiving groove (207) for receiving and holding the shaft type spring (40).

10. The split oil seal according to claim 1, characterized in that it further comprises a rigid support ring provided embedded between the outer ring (10, 100) and the inner ring (20, 200).

11. The split oil seal according to claim 1, characterized in that the outer ring cut (12) is formed with an insert-type joint (13), the insert-type joint (13) comprising an insertion portion which is formed by one end of the outer ring (10, 100) and an accommodating portion which is formed by the other end of the outer ring (10, 100) and which matches the shape of the insertion portion.

12. The split oil seal according to claim 11, characterized in that the insertion portion is formed in a trapezoidal shape, V-shape, toothed shape or hemispherical shape.

13. The split oil seal according to claim 1, characterized in that the outer ring cut (12) is offset from the inner ring cut (22) by a distance of 10 degrees or more in 360-degree circumference.

14. A method of forming a dual split-seal assembly, said method comprising the steps of:

forming an inner ring to have a first ring cut;

forming an outer ring surrounding said inner ring, said outer ring having a second ring cut, said first and second ring cuts defining a structural break extending completely through each of said inner and outer rings, respectively;

providing a first forcing element in tensioning communication with said inner ring and said outer ring;

providing a second forcing element in tensioning communication with said inner ring;

wherein said outer ring includes an outer peripheral portion located outermost in a radial direction, an extension portion extending radially inward from said outer peripheral portion, and a protruding portion extending axially and protruding in a radial direction from said extension portion to form an inner ring receiving groove, wherein said inner ring is captured between opposing and axially extending faces of said protruding portion; and wherein said first forcing element includes an anchoring portion that extends axially and is captured between said inner ring and said outer ring.

* * * * *